United States Patent
Amir et al.

(10) Patent No.: US 12,363,354 B2
(45) Date of Patent: Jul. 15, 2025

(54) SERVER AND METHOD

(71) Applicant: 17LIVE Japan Inc., Tokyo (JP)

(72) Inventors: Mohammad Amir, Tokyo (JP); Gayathri Manohar, Tokyo (JP); Manasvi Ghelani, Tokyo (JP); Hardik Taneja, Tokyo (JP); Abinash Sen, Tokyo (JP); Jayneel Pawar, Tokyo (JP)

(73) Assignee: 17LIVE JAPAN INC., Tokyo (JP)

( * ) Notice: Subject to any disclaimer, the term of this patent is extended or adjusted under 35 U.S.C. 154(b) by 253 days.

(21) Appl. No.: 18/318,358

(22) Filed: May 16, 2023

(65) Prior Publication Data
US 2024/0031616 A1    Jan. 25, 2024

(30) Foreign Application Priority Data
Jul. 19, 2022    (JP) .................................. 2022-114648

(51) Int. Cl.
*H04N 21/2187*    (2011.01)
*H04N 21/25*    (2011.01)
*H04N 21/258*    (2011.01)
*H04N 21/475*    (2011.01)

(52) U.S. Cl.
CPC ....... *H04N 21/2187* (2013.01); *H04N 21/251* (2013.01); *H04N 21/25891* (2013.01); *H04N 21/4756* (2013.01)

(58) Field of Classification Search
CPC ............. H04N 21/2187; H04N 21/251; H04N 21/25891; H04N 21/4756; H04N 21/2668; H04N 21/4826
See application file for complete search history.

(56) References Cited

U.S. PATENT DOCUMENTS

| | | | |
|---|---|---|---|
| 2021/0297470 A1* | 9/2021 | Goodman | G06F 16/64 |
| 2021/0337167 A1* | 10/2021 | Garg | H04L 51/52 |
| 2024/0388742 A1* | 11/2024 | Dong | H04N 21/431 |

FOREIGN PATENT DOCUMENTS

| | | |
|---|---|---|
| JP | 2018-045382 A | 3/2018 |
| JP | 2020-521207 A | 7/2020 |
| JP | 2020-188514 A | 11/2020 |

OTHER PUBLICATIONS

Notification of Reasons for Refusal dated Oct. 4, 2022, issued in corresponding Japanese Patent Application No. 2022-114648 with English translation (8 pgs.).

* cited by examiner

*Primary Examiner* — Oschta I Montoya
(74) *Attorney, Agent, or Firm* — Pillsbury Winthrop Shaw Pittman, LLP

(57) ABSTRACT

A server includes: a specifying unit for specifying a live-stream to be preferentially recommended; an obtaining unit for obtaining, for the specified live-stream to be preferentially recommended, a number of users to whom the live-stream is recommended; a generating unit for generating a group of users by selecting a number of users corresponding to the obtained number of users to whom the live-stream is recommended; and a setting unit for setting a list of live-streams to be recommended to a user included in the generated group of users such that the live-stream to be preferentially recommended is presented in priority over other live-streams in the list on a terminal of the user.

8 Claims, 14 Drawing Sheets

| Stream ID | Streamer ID | Viewer ID | The Number of Established Viewers | Start Time | Content Tag | Rating |
|---|---|---|---|---|---|---|
| ST1 | LR1 | VR1, VR2, VR3, ⋯ | 1 | 2022/6/20 4:00 | Singing | Good |
| ST2 | LR2 | VR5, VR6, VR7, ⋯ | 0 | 2022/6/20 9:45 | Chatting | NA |
| ST3 | LR3 | VR10, VR11, ⋯ | 0 | 2022/6/20 9:55 | Game | NA |

| User ID | Points | Reward | Level | Age Range | Gender | Hair Color | Status |
|---|---|---|---|---|---|---|---|
| LR1 | 3243 | 1500 | 45 | 21-30 | Female | Blonde | Streaming |
| LR2 | 2510 | 800 | 7 | 31-40 | Male | Black | Streaming |
| LR3 | 1803 | 0 | 15 | 21-30 | Female | Brown | Streaming |
| VR1 | 520 | 0 | 0 | 41-50 | Male | Black | Viewing |
| US1 | 200 | 0 | 0 | 21-30 | Female | Black | Active |
| US2 | 400 | 300 | 41 | 41-50 | Male | Black | Logout |

| Gift ID | Granted Reward | Price Points |
|---|---|---|
| TT01 | 90 | 100 |
| TE01 | 180 | 200 |

| Display Position | Average Click Rate |
|---|---|
| 1~6 | 10% |
| 1~21 | 8% |
| 1~30 | 5% |

| Level Range | Required Number of Established Viewers | Required Number of Clicks |
|---|---|---|
| 1～10 | 5 | 3 |
| 11～20 | 10 | 2 |
| 21～30 | 20 | 1.5 |

| No. | User ID | Similarity Score |
|---|---|---|
| 1 | US30 | 0.95 |
| 2 | VR24 | 0.93 |
| 300 | US1 | 0.61 |

| Display Position | Stream ID | Thumbnail Data | Similarity Score |
|---|---|---|---|
| 1 | ST33 | bbb | 0.98 |
| 2 | ST24 | ccc | 0.91 |
| 3 | ST50 | ddd | 0.89 |

| Display Position | Stream ID | Thumbnail Data | Similarity Score |
|---|---|---|---|
| 1 | ST2 | aaa | 0.61 |
| 2 | ST33 | bbb | 0.98 |
| 3 | ST24 | ccc | 0.91 |
| 4 | ST50 | ddd | 0.89 |

350

SERVER AND METHOD

CROSS-REFERENCE TO RELATED APPLICATIONS

This application is based on and claims the benefit of priority from Japanese Patent Application Serial No. 2022-114648 (filed on Jul. 19, 2022), the contents of which are hereby incorporated by reference in its entirety.

TECHNICAL FIELD

The present disclosure relates to a server and a method.

BACKGROUND

With the development of IT technology, the way information is exchanged has changed. In the Showa period (1926-1989), one-way information communication via newspapers and television was the main stream. In the Heisei period (1990-2019), with the widespread availability of cell phones and personal computers, and the significant improvement in Internet communication speed, instantaneous interactive communication services such as chat services emerged, and on-demand video distribution services also become popular as storage costs were reduced. And nowadays or in the Reiwa period (2019 to present), with the sophistication of smartphones and further improvements in network speed as typified by 5G, services that enable real-time communication through video, especially live-stream services, are gaining recognition. The number of users of live-stream services is expanding, especially among young people, as such services allow people to share fun moments even when they are in physically separate locations from each other.

In live-streaming platforms, distributors can start a live-stream whenever they want and viewers can watch live-streams of their interest whenever they want. Japanese Translation of PCT International Patent Application No. 2020-521207 ("the '207 Publication") discloses a technique for recommending live-streaming contents using machine learning.

Usually, there are no viewers immediately after a streamer starts a live-stream, and viewers of the live-stream will increase as the live stream continues. While live-streams of popular streamers will quickly attract viewers, most other streamers, especially new ones, tend to take a relatively long time to get their first viewers. If streamers fail to attract viewers, they might give up live-streaming.

SUMMARY

The present disclosure was made in view of the above, and one object is to provide a mechanism to help streamers attract viewers to their live-streams that have been started.

One aspect of the present disclosure relates to a server. The server includes: a specifying unit for specifying a live-stream to be preferentially recommended; an obtaining unit for obtaining a number of users to whom the live-stream is recommended for the specified live-stream to be preferentially recommended; a generating unit for generating a group of users by selecting a number of users corresponding to the obtained number of users to whom the live-stream is recommended; and a setting unit for setting a list of live-streams to be recommended to a user included in the generated group of users such that the live-stream to be preferentially recommended is presented in priority over other live-streams in the list on a terminal of the user.

It should be noted that the components described throughout this disclosure may be interchanged or combined. The components, features, and expressions described above may be replaced by devices, methods, systems, computer programs, recording media containing computer programs, etc. Any such modifications are intended to be included within the spirit and scope of the present disclosure.

BRIEF DESCRIPTION OF THE DRAWINGS

FIG. 4 is a data structure diagram showing an example of a stream DB in FIG. 3.

FIG. 5 is a data structure diagram showing an example of a user DB in FIG. 3.

FIG. 6 is a data structure diagram showing an example of a gift DB in FIG. 3.

FIG. 7 is a data structure diagram showing an example of a click rate DB in FIG. 3.

FIG. 8 is a data structure diagram showing an example of a settings DB in FIG. 3.

FIG. 9 is a data structure diagram showing an example of a user pool table in FIG. 3.

FIGS. 12A, 12B, and 12C illustrate a process of generating a recommended live-stream list.

DESCRIPTION OF THE EMBODIMENTS

Like elements, components, processes, and signals throughout the figures are labeled with same or similar designations and numbering, and the description for the like elements will not be hereunder repeated. For purposes of clarity and brevity, some of the components that are less related and thus not described are not shown in the figures.

In a live-streaming system related to one embodiment, when a streamer starts a live-stream (hereinafter referred to as "subject live-stream"), a suggested number of users is calculated according to the level of the streamer. The live-streaming system calculates a similarity score between active users who are logged in the live-streaming platform and the subject live-stream. The live-streaming system generates a user pool (a group of users) corresponding to the subject live-stream by selecting users with higher similarity scores, and the number of the selected users is equal to the suggested number of users. The live-streaming system sends a recommended live-stream list in which the subject live-stream appears high up, to the user terminal of each user in the user pool. The user terminal displays thumbnails of the recommended live-streams on a recommended live-stream screen based on the received recommended live-stream list. In this way, the subject live-stream is shown up high on the recommended live-stream screens of the number of users corresponding to the suggested number of users. Accordingly, viewers are more likely to watch the subject live-stream, and the streamer can be motivated to continue live-streaming. In addition, by limiting the number of users to whom the subject live-stream is displayed high on the list to the predetermined number of users, each live-stream can be displayed high on the list for a sufficient period of time even when many live-streams are started at the same time.

Figure 1:
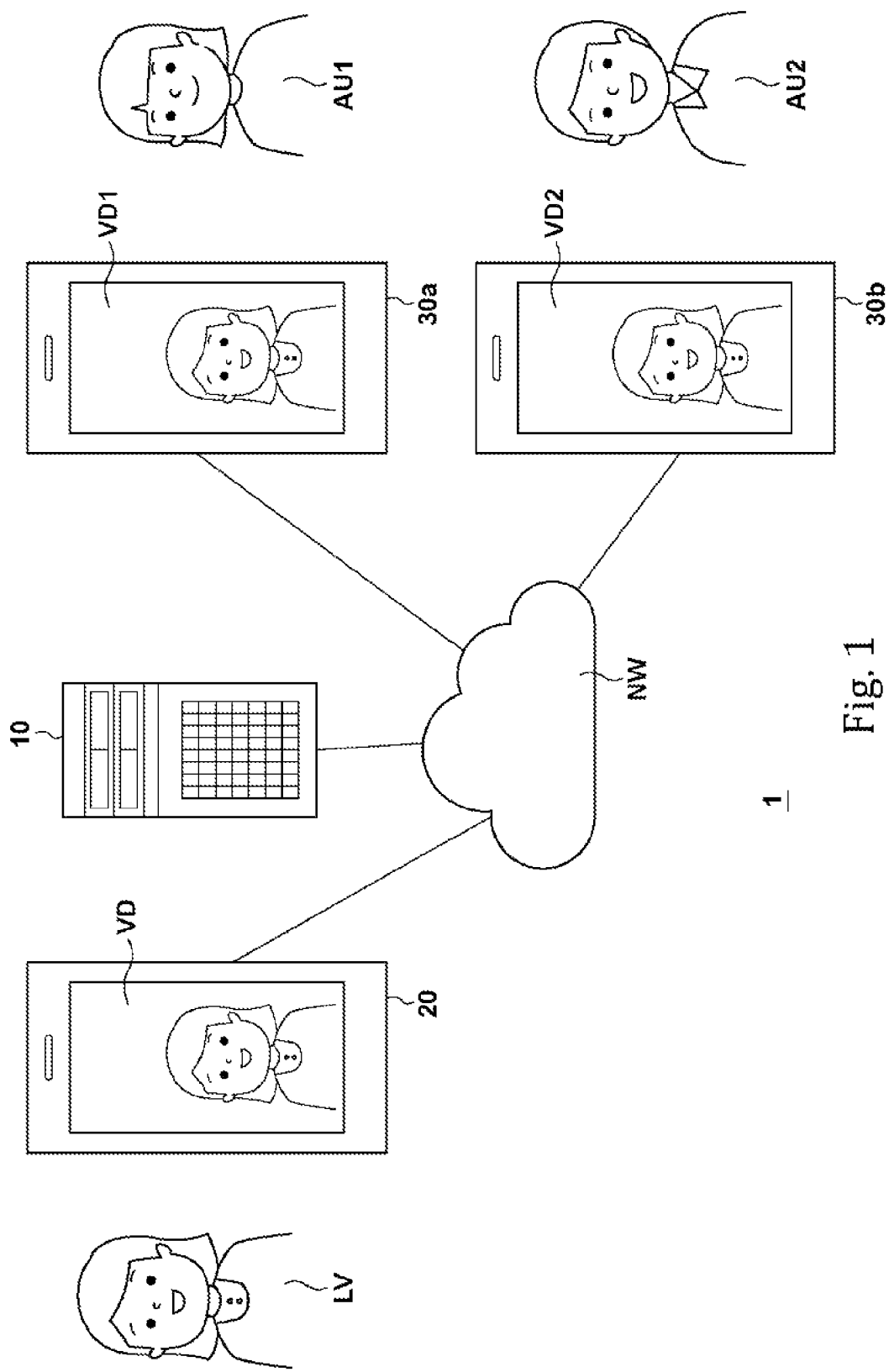
FIG. 1 schematically illustrates a configuration of a live-streaming system in one embodiment of the disclosure.

FIG. 1 schematically illustrates a configuration of a live-streaming system 1 according one embodiment of the disclosure. The live-streaming system 1 provides an interactive live-stream service that allows a distributor LV (also referred to as a liver or streamer) and a viewer AU (also referred to as audience) (AU1, AU2 . . . ) to communicate in real time. As shown in FIG. 1, the live-streaming system 1 includes a server 10, a user terminal 20 on the distributor side, and user terminals 30 (30a, 30b . . . ) on the audience side. The distributor and viewers may be collectively referred to as users. The server 10 may be one or more information processing devices connected to a network NW. The user terminals 20 and 30 may be, for example, mobile terminal devices such as smartphones, tablets, laptop PCs, recorders, portable gaming devices, and wearable devices, or may be stationary devices such as desktop PCs. The server 10, the user terminal 20, and the user terminals 30 are interconnected so as to be able to communicate with each other over the various wired or wireless network NW.

The live-streaming system 1 involves the distributor LV, the viewers AU, and an administrator (not shown) who manages the server 10. The distributor LV is a person who broadcasts contents in real time by recording the contents with his/her user terminal 20 and uploading them directly to the server 1. Examples of the contents may include the distributor's own songs, talks, performances, fortune-telling, gameplays, and any other contents. The administrator provides a platform for live-streaming contents on the server 10, and also mediates or manages real-time interactions between the distributor LV and the viewers AU. The viewers AU access the platform at their user terminals 30 to select and view a desired content. During live-streaming of the selected content, the viewer AU performs operations to comment, cheer, or ask fortune-telling via the user terminal 30, the distributor LV who is delivering the content responds to such a comment, cheer, or request and such response is transmitted to the viewer AU via video and/or audio, thereby establishing an interactive communication.

As used herein, the term "live-streaming" or "live-stream" may mean a mode of data transmission that allows a content recorded at the user terminal 20 of the distributor LV to be played and viewed at the user terminals 30 of the viewers AU substantially in real time, or it may mean a live broadcast realized by such a mode of transmission. The live-streaming may be achieved using existing live delivery technologies such as HTTP Live Streaming, Common Media Application Format, Web Real-Time Communications, Real-Time Messaging Protocol and MPEG DASH. The live-streaming includes a transmission mode in which, while the distributor LV is recording contents, the viewers AU can view the contents with a certain delay. The delay is acceptable as long as interaction between the distributor LV and the viewers AU can be at least established. Note that the live-streaming is distinguished from so-called on-demand type transmission, in which contents are entirely recorded and the entire data is once stored on the server, and the server provides users with the data at any subsequent time upon request from the users.

The term "video data" herein refers to data that includes image data (also referred to as moving image data) generated using an image capturing function of the user terminals 20 and 30 and audio data generated using an audio input function of the user terminals 20 and 30. Video data is reproduced in the user terminals 20 and 30, so that the users can view contents. In this embodiment, it is assumed that between video data generation at the distributor's user terminal and video data reproduction at the viewer's user terminal, processing is performed onto the video data to change its format, size, or specifications of the data, such as compression, decompression, encoding, decoding, or transcoding. However, the content (e.g., video images and audios) represented by the video data before and after such processing does not substantially change, so that the video data after such processing is herein described as the same as the video data before such processing. In other words, when video data is generated at the distributor's user terminal and then played back at the viewer's user terminal via the server 10, the video data generated at the distributor's user terminal, the video data that passes through the server 1, and the video data received and reproduced at the viewer's user terminal are all the same video data.

In the example in FIG. 1, the distributor LV is live-streaming his/her talk. The user terminal 20 of the distributor LV generates video data by recording images and sounds of the distributor LV telling fortune, and the generated data is transmitted to the server 10 over the network NW. At the same time, the user terminal 20 displays a recorded video image VD of the distributor LV on the display of the user terminal 20 to allow the distributor LV to check the live stream currently performed.

The user terminals 30a and 30b of the viewers AU1 and AU2 respectively, who have requested the platform to view the live-stream of the distributor LV, receive video data related to the live-stream (may also be herein referred to as "live-streaming video data") over the network NW and reproduce the received video data to display video images VD1 and VD2 on the displays and output audio through the speakers. The video images VD1 and VD2 displayed at the user terminals 30a and 30b, respectively, are substantially the same as the video image VD captured by the user terminal 20 of the distributor LV, and the audio outputted at the user terminals 30a and 30b is substantially the same as the audio recorded by the user terminal 20 of the distributor LV.

Recording of the images and sounds at the user terminal 20 of the distributor LV and reproduction of the video data at the user terminals 30a and 30b of the viewers AU1 and AU2 are performed substantially simultaneously. Once the viewer AU types a comment about the talk of the distributor LV on the user terminal 30a, the server 10 displays the comment on the user terminal 20 of the distributor LV in real time and also displays the comment on the user terminals 30a and 30b of the viewers AU1 and AU2, respectively. When the distributor LV reads the comment and develops his/her talk to cover and respond the comment, the video and sound of the talk are displayed on the user terminals 30a and 30b of the viewers AU1 and AU2, respectively. This interactive action is recognized as establishment of a conversation between the distributor LV and the viewer AU1. In this way, the live-streaming system 1 realizes the live-streaming that enables the interactive communication, not one-way communication.

Figure 2:
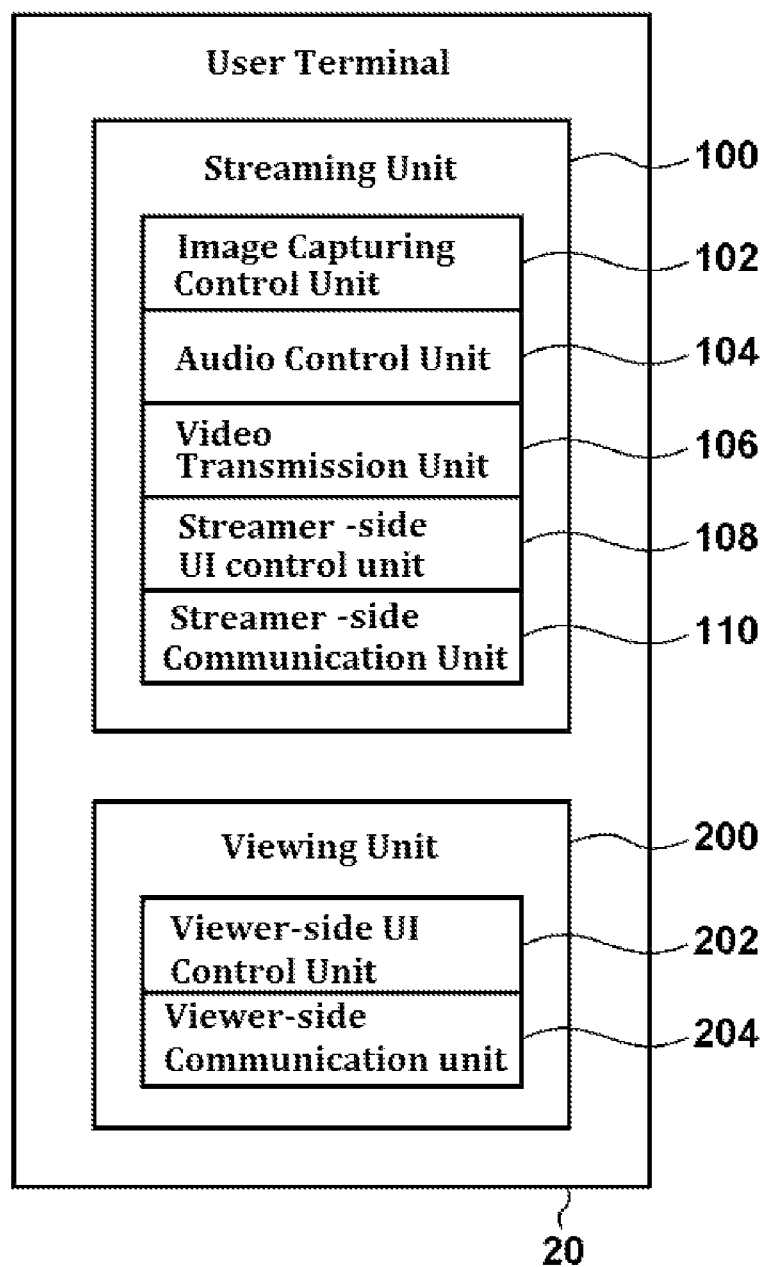
FIG. 2 is a block diagram showing functions and configuration of a user terminal shown in FIG. 1.

FIG. 2 is a block diagram showing functions and configuration of the user terminal 20 of FIG. 1. The user terminals 30 have the same functions and configuration as the user terminal 20. The blocks in FIG. 2 and the subsequent block diagrams may be realized by elements such as a computer CPU or a mechanical device in terms of hardware, and can be realized by a computer program or the like in terms of software. The blocks shown in the drawings are, however, functional blocks realized by cooperative operation between hardware and software. Therefore, it is understood by those skilled in the art that these functional blocks can be realized in various forms by combining hardware and software.

The distributor LV and the viewers AU download and install a live-streaming application program (hereinafter referred to as a live-streaming application) according to the embodiment, onto the user terminals 20 and 30 from a download site over the network NW. Alternatively, the live-streaming application may be pre-installed on the user terminals 20 and 30. When the live-streaming application is executed on the user terminals 20 and 30, the user terminals 20 and 30 communicate with the server 10 over the network NW to implement various functions. Hereinafter, the functions implemented by (processors such as CPUs of) the user terminals 20 and 30 by running the live-streaming application will be described as functions of the user terminals 20 and 30. These functions are realized in practice by the live-streaming application on the user terminals 20 and 30. In any other embodiments, these functions may be realized by a computer program that is written in a programming language such as HTML (HyperText Markup Language), transmitted from the server 10 to web browsers of the user terminals 20 and 30 over the network NW, and executed by the web browsers.

The user terminal 20 includes a distribution unit 100 that generates video data in which the user's image and sound are recorded and provides the video data to the server 10, and a viewing unit 200 to which the video data is provided from the server 10 to reproduce the video data. The user activates the streaming unit 100 when the user performs live-streaming, and activates the viewing unit 200 when the user views a video. The user terminal in which the streaming unit 100 is activated is the distributor's terminal, i.e., the user terminal that generates the video data, and the user terminal in which the viewing unit 200 is activated is the viewer's terminal, i.e., the user terminal in which the video data is reproduced and played.

In addition to streamers who are delivering live streams and viewers who are watching their live streams, there are also users who have logged into the live-streaming platform but are neither delivering nor watching. Such users are herein referred to as active users.

The streaming unit 100 includes an image capturing control unit 102, an audio control unit 104, a video transmission unit 106, a distributor-side UI control unit 108, and a distributor-side communication unit 110. The image capturing control unit 102 is connected to a camera (not shown in FIG. 2) and controls image capturing performed by the camera. The image capturing control unit 102 obtains image data from the camera. The audio control unit 104 is connected to a microphone (not shown in FIG. 2) and controls audio input from the microphone. The audio control unit 104 obtains audio data through the microphone. The video transmission unit 106 transmits video data including the image data obtained by the image capturing control unit 102 and the audio data obtained by the audio control unit 104 to the server 10 over the network NW. The video data is transmitted by the video transmission unit 106 in real time. That is, the generation of the video data by the image capturing control unit 102 and the audio control unit 104, and the transmission of the generated video data by the video transmission unit 106 are performed substantially at the same time.

The distributor-side UI control unit 108 controls an UI for the distributor. The distributor-side UI control unit 108 is connected to a display (not shown in FIG. 2), and displays a video on the display by reproducing the video data that is to be transmitted by the video transmission unit 106. The viewing-side UI control unit 108 is also connected to input means (not shown in FIG. 2) such as touch panels, keyboards, and displays, and obtains the distributor's input via the input means. The distributor-side UI control unit 108 superimposes a predetermined frame image on the video image. The frame image includes various user interface objects (hereinafter simply referred to as "objects") for accepting inputs from the distributor, comments entered by the viewers, and information obtained from the server 10. The distributor-side UI control unit 108, for example, accepts tap input by the distributor on the objects.

The distributor-side communication unit 110 controls communication with the server 10 during a live-stream. The distributor-side communication unit 110 transmits the content of the distributor's input that has been obtained by the distributor-side UI control unit 108 to the server 10 over the network NW. The distributor-side communication unit 110 receives various information associated with the live-stream from the server 10 over the network NW.

The viewing unit 200 includes a viewer-side UI control unit 202 and a viewer-side communication unit 204. The viewer-side communication unit 204 controls communication with the server 10 during a live-stream. The viewer-side communication unit 204 receives, from the server 10 over the network NW, video data related to the live-stream in which the distributor and the viewer participate.

The viewing-side UI control unit 202 controls the UI for the viewer. The viewer-side UI control unit 202 is connected to a display and a speaker (not shown in FIG. 2), and reproduces the received video data to display video images on the display and output audio through the speaker. The state where the image is outputted to the display and the audio is outputted from the speaker can be referred to as "the video data is played". The viewer-side UI control unit 202 is also connected to input means (not shown in FIG. 2) such as touch panels, keyboards, and displays, and obtains viewer's input via the input means. The viewer-side UI control unit 202 superimposes a predetermined frame image on an image generated from the video data obtained from the server 10. The frame image includes various objects for accepting inputs from the viewer, comments entered by the viewer, and information obtained from the server 10. The viewer-side communication unit 204 transmits the content of the viewer's input that has been obtained by the viewer-side UI control unit 202 to the server 10 over the network NW.

Figure 10:
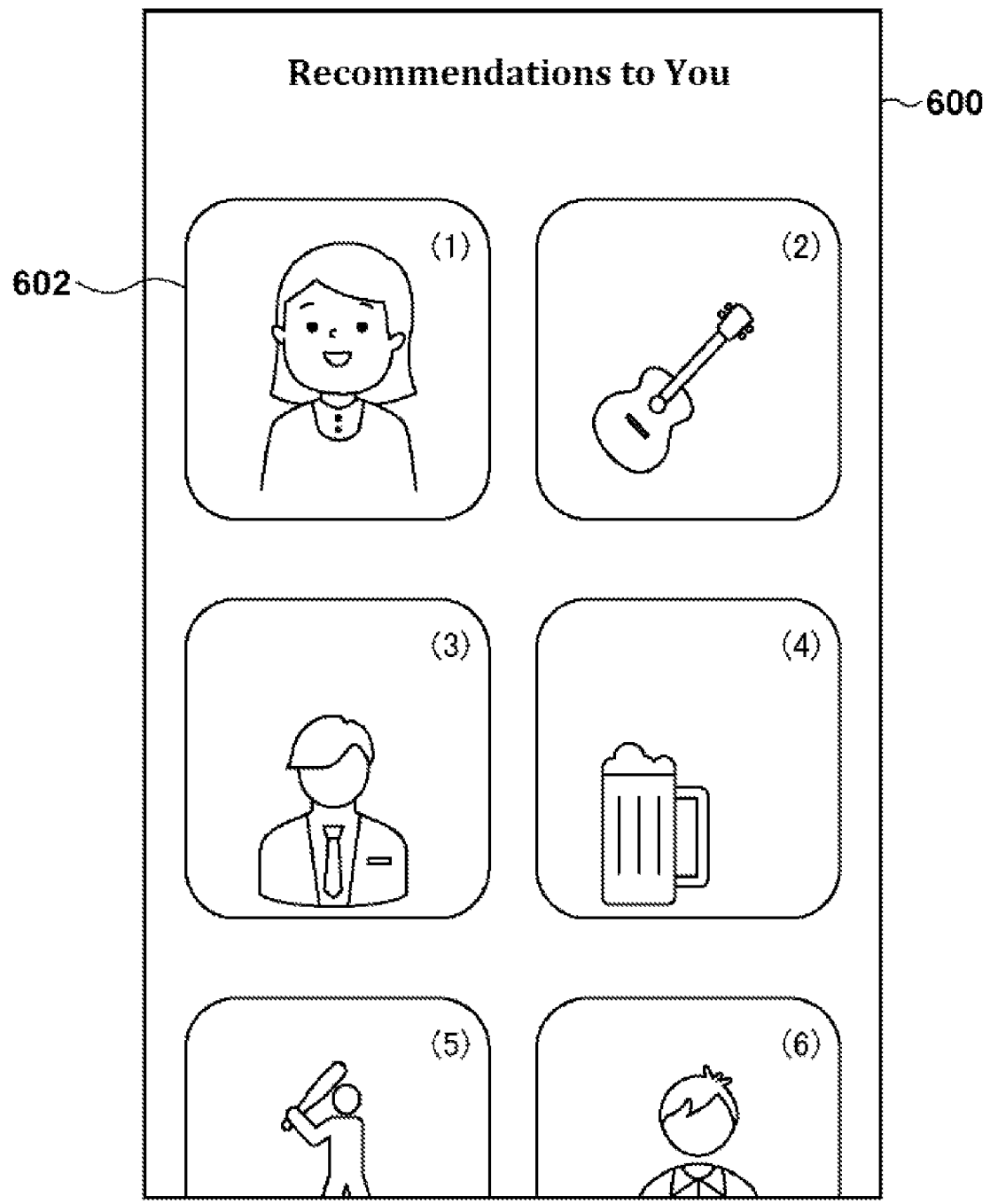
FIG. 10 is a representative screen image of a live-stream recommendations screen on a user terminal display of an active user.

FIG. 10 is a representative screen image of a live-stream recommendations screen 600 shown on the display of the user terminal 30 of an active user. The viewer-side UI control unit 202 generates the live-stream recommendations screen 600 based on the list of the recommended live-streams received from the server 10 and shows the screen on the display. Upon selection of a live-stream on the live-stream recommendations screen 600 by the active user (for example, tapping the thumbnail of the live-stream, the viewer-side communication unit 204 generates a streaming request with the stream ID of the selected live-stream, and transmits the request to the server 10 over the network NW.

The live-stream recommendations screen 600 includes thumbnails 602 indicating live-streams in the list of the recommended live-streams. In the example of FIG. 10, the live-stream recommendations screen 600 includes a list display in which two thumbnails 602 are shown in each row, and the list display is scrollable in the vertical direction. The display positions of the thumbnails on the live-stream recommendations screen 600 are herein numbered as follows:

1: Left one in the uppermost row
2: Right one in the uppermost row
3: Left one in the second row
4: Right one in the second row . . . .

The display position numbers are shown in parentheses for convenience in FIG. 10. The live-stream recommendations screen 600 is scrolled to the top immediately after it is opened. In the example of FIG. 10, the top row and the second row are always displayed immediately after the live-stream recommendations screen 600 is opened. Therefore, it can be said that the thumbnails in the topmost and second rows attract more attention than the thumbnails in other positions. In other words, the smaller the number of the display position, the thumbnail may attract more attention or the thumbnail is at the position where the live-stream is preferentially recommended.

Figure 3:
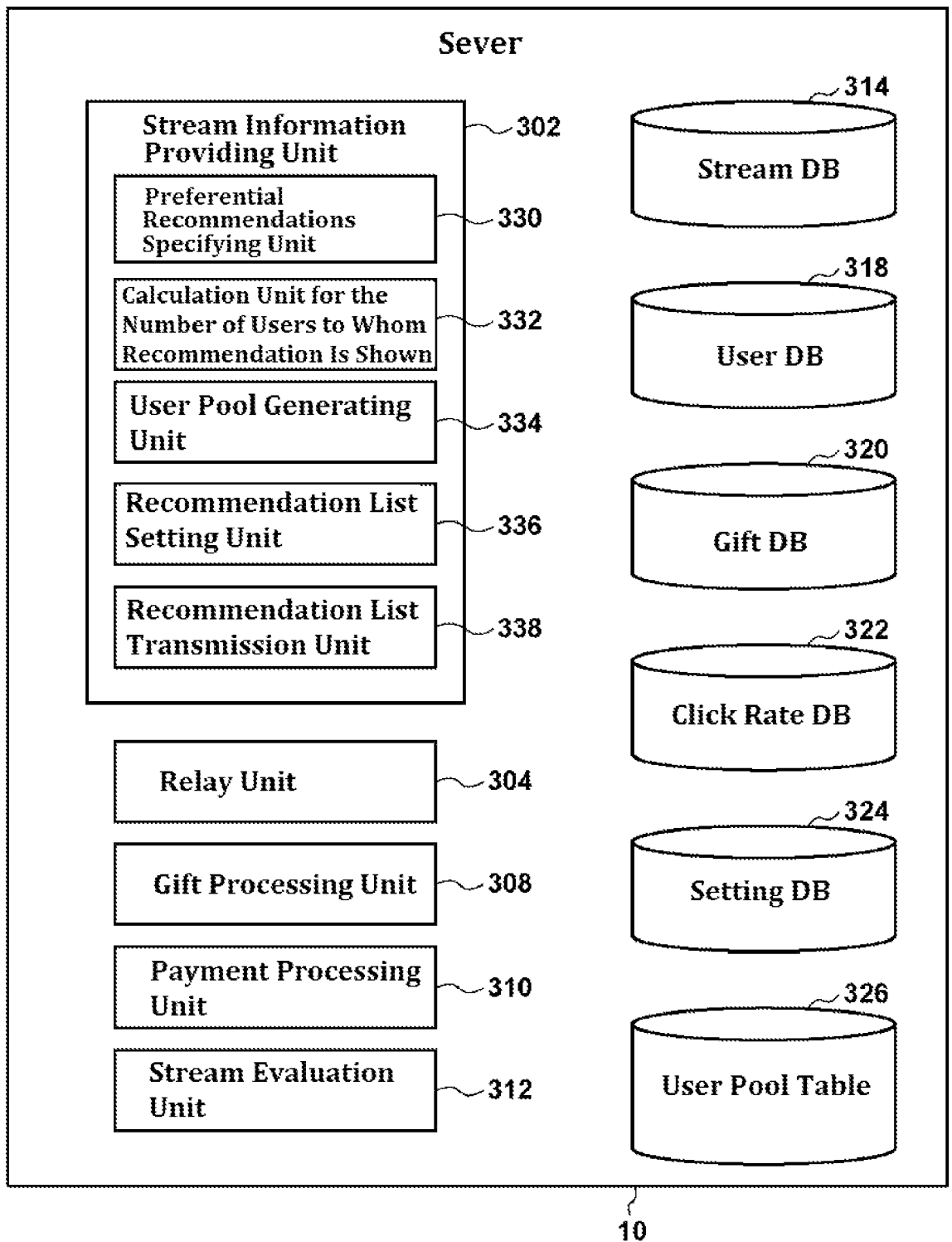
FIG. 3 is a block diagram showing functions and configuration of a server shown in FIG. 1.

FIG. 3 is a block diagram showing functions and configuration of the server 10 of FIG. 1. The server 10 includes a stream information providing unit 302, a relay unit 304, a gift processing unit 308, a payment processing unit 310, a stream evaluation unit 312, a stream DB 314, a user DB 318, a gift DB 320, a click rate DB 322, a settings DB 324, and a user pool table 326.

FIG. 4 is a data structure diagram showing an example of the stream DB 314 of FIG. 3. The stream DB 314 holds information regarding live-streams currently taking place. The stream DB 314 stores an stream ID for identifying a live-stream on a live-streaming platform provided by the live-streaming system 1, a streamer ID, which is a user ID for identifying the distributor who provides the live-stream, a viewer ID, which is a user ID for identifying a viewer of the live-stream, the number of established or engaged viewers of the live-stream, the start time of the live-stream, a content tag representing the content of the live-stream, and a rating given to the live-stream, in association with each other.

In the live-streaming platform provided by the live-streaming system 1 of the embodiment, when a user live-streams, the user becomes a distributor, and when the same user views a live-stream broadcast by another user, the user also becomes a viewer. Therefore, the distinction between a distributor and a viewer is not fixed, and a user ID registered as a distributor ID at one time may be registered as a viewer ID at another time.

Established viewers of a live-stream refers to viewers who are engaged or are likely to engage in the live-stream. For example, among viewers of a live-stream, the established viewers of the live stream are the viewers who have been watching the live-stream for more than a predetermined amount of time, e.g., more than five minutes. Alternatively, among viewers of a live-stream, the established viewers of the live-stream are the viewers who have gifted more than a predetermined amount. Or, among viewers of a live-stream, the established viewers of the live-stream are the viewers who have commented more than a predetermined amount, e.g., more than 10 times. Alternatively, the established viewer may be determined by combining the above three conditions of the continuous viewing time, the gifting, and the comments as appropriate.

The content tag of a live-stream may be designated by the streamer when starting the live-stream or obtained from real-time analysis of the live-stream by a machine learning model.

FIG. 5 is a data structure diagram showing an example of the user DB 318 of FIG. 3. The user DB 318 holds information regarding users. The user DB 318 holds a user ID identifying the user, points the user has, a reward given to the user, the level of the user, attributes of the user, and the status of the user, in association with each other. The attributes of the user include the age range where the user's age is included, the gender of the user, and the hair color of the user.

The points are an electronic representation of value circulated in the live-streaming platform. Users are able to purchase points by credit card or other means of payment. A reward is an electronic representation of value defined in the live-streaming platform and is used to determine the amount of money the distributor receives from the administrator of the live-streaming platform. On the live-streaming platform, when viewers give gifts to the distributor during or after his/her live-stream, the viewer's points are consumed and the distributor's reward is increased by a corresponding amount.

The level is an indicator of the user's past performance as a streamer on the live-streaming platform. In other embodiments, the level may be an indicator of the user's past performance as a viewer on the live-streaming platform, or it may be a combined indicator of the user's performance as a streamer and as a viewer. The level may increase or decrease depending on the number of times the user has delivered a live-stream, the total streaming time of the live-streams, the total viewed time of the live-streams, the total viewing time as a viewer of live-streams, the number and/or amount of gifts the user has given, the number and/or amount of gifts the user has received, the number of comments, etc. Alternatively, the streamer's level may also be rated or determined by the administrator based on reviews on the streamer, viewer satisfaction with the streamer's live-streams, and comments made during the streamer's live-streams. Alternatively, the level may be automatically determined based on predetermined rules or a machine learning model.

The status of the user changes such that it is "active" when the user is an active user, "streaming" when the user is delivering a live-stream, "watching" when the user is watching a live stream, or "logged out" when the user is not logged into the live-streaming platform.

FIG. 6 is a data structure diagram showing an example of the gift DB 320 of FIG. 3. The gift DB 320 holds information regarding gifts available for the viewers in the live-streaming. A gift is electronic data with the following characteristics:

It can be purchased in exchange for the points or money, or can be given for free.
It can be given by a viewer to a distributor.
Giving a gift to a distributor is also referred to as using the gift or throwing the gift.
Some gifts may be purchased and used at the same time, and some gifts may be purchased and then used at any time later by the purchaser viewer.
When a viewer gives a gift to a distributor, the distributor is given a corresponding reward.

When a gift is used, the use may trigger an effect associated with the gift. For example, an effect corresponding to the gift will appear on the live-streaming room screen.

The gift DB 320 stores: a gift ID for identifying a gift; a granted reward, which is a reward given to a distributor when the gift is given to the distributor; and price points, which is the amount of points to be paid for use of the gift, in association with each other. A viewer is able to give a desired gift to a distributor by paying the price points of the desired gift while viewing the live-stream. The payment of the price points may be made by an appropriate electronic payment means. For example, the payment may be made by the viewer paying the price points to the administrator. Alternatively, bank transfers or credit card payments may be available. The administrator is able to desirably set the relationship between the granted reward and the price points. For example, it may be set as the granted reward=the price points. Alternatively, points obtained by multiplying the granted reward by a predetermined coefficient such as 1.2 may be set as the price points, or points obtained by adding predetermined fee points to the granted reward may be set as the price points.

FIG. 7 is a data structure diagram showing an example of the click rate DB 322 of FIG. 3. The click rate DB 322 holds the area of the thumbnail display position when the live-stream is preferentially recommended to the user, and the average click rate, in association with each other. The average click rate or average conversion rate is the ratio of users who clicked on a thumbnail displayed at one of the display positions in a given area and started watching the corresponding live stream to users who opened the live-stream recommendations screen 600. The average click rate may be calculated by analyzing the viewing history of past live-streams. In this embodiment, for each area of display positions, the probabilities that a thumbnail at each of the display positions within the area is clicked are calculated first, and then the average click rate is calculated by dividing the sum of the probabilities by the number of display positions within the area. In the example of FIG. 7, when the calculated click rate for display position 1 is 15%, 13% for display position 2, 11% for display position 3, 9% for display position 4, 7% for display position 5, 5% for display position 6, from the statistics, the click rate for the area of the display positions 1 to 6 is calculated as 15+13+11+9+7+5=60. By dividing this calculated value of 60 by the number of display positions, which is six, the average click rate of 10% for the area of the display positions 1 to 6 is calculated.

Since the area of display positions held in the click rate DB 322 is the area where the display position starts from display position 1 with the highest click rate, when a thumbnail is displayed at a display position within this area, the live stream of that thumbnail is preferentially recommended to the user over other live-streams whose thumbnails are displayed at display positions outside the area. The area of display positions held in the click rate DB 322 is herein referred to as a priority area. The average click rate is an example of the probability that the user will select the live-stream when the live-stream is recommended top on the list. In other embodiments, the click rate for each display position may be used instead of the average click rate. The average click rate is a parameter that is independent of the user level.

FIG. 8 is a data structure diagram showing an example of the settings DB 324 in FIG. 3. The settings DB 324 holds values of parameters for calculating the number of users to whom the live-stream is recommended. The settings DB 324 holds the range of levels, the number of required established viewers, and the number of required clicks, in association with each other.

The number of required established viewers is a parameter that depends on a streaming continuation rate of a streamer, and is set such that the higher the streamer's level, the greater the number of users to whom the streamer's live-stream is recommended. In the example in FIG. 8, the higher the level of the distributor, the more established viewers are required.

Regarding the required number of established viewers, the inventor has found that there is a correlation between a streaming duration of a live stream and the number of established viewers of the live-stream. In particular, the inventor found that the higher the number of established viewers, the longer the streamer continues to deliver the live-stream. Based on this finding, the streaming continuation rate of the streamer is defined as the probability that the streamer will continue the live-stream for a predetermined period of time, e.g., 30 minutes, or longer. The required number of established viewers for the streamer is defined as the minimum number of established viewers required for the streamer's streaming continuation rate to exceed a predetermined value, e.g., 80%. In the example of FIG. 8, the required number of established viewers is set for each level range. The required number of established viewers may be determined by analyzing the viewing history of past live-streams.

The reason why the required number of established viewers is increased with the increasing level of the streamer is that higher level streamers are used to live-streaming and have higher expectations for their live-streaming, so they need more established viewers. In other words, it may be because lower level streamers are less experienced and satisfied with a smaller number of viewers, but when they become more experienced, they will not be completely satisfied with the small number of viewers.

The required number of clicks or ClickToEngage Rate is a parameter that depends on viewing continuation rate of viewers, and is set such that the higher the streamer's level, the fewer the number of users to whom the streamer's live-stream is recommended. In the example in FIG. 8, the higher the level of the streamer, the smaller the required number of clicks is. The required number of clicks for a streamer is the number corresponding to the probability that the streamer can turn viewers who visit the streamer's live-stream into established viewers. For example, the required number of clicks=3 indicates that if three viewers visit the live-stream, the probability that one of them will become the established viewer exceeds a predetermined value, e.g., 80%. When the viewing continuation rate of a viewer is defined as the probability that the viewer will become the established viewer, the required number of clicks corresponds to the reciprocal of the viewing continuation rate. For example, the number of required clicks=3 corresponds to the viewing continuation rate=1/3, which means that when the viewing continuation rate is approximately 33%, three viewers are required to obtain one established viewer. The required number of clicks may be obtained by analyzing the viewing history of past live-streams.

The reason why the lower number of clicks required for the streamers with higher levels is that the more experienced the streamers are, the better the quality of their live-streams and the streamer's skill, and they are likely to have more established viewers.

FIG. 9 is a data structure diagram showing an example of the user pool table 326 of FIG. 3. The user pool table 326 is associated with a given live-stream that has been initiated and is provided for each such live-stream. The user pool table 326 holds a number, the user ID of an active user, and a similarity score between the given live-stream and the active user, in association with each other. The user pool table 326 holds the number of user IDs corresponding to the calculated number of users to whom the live-stream is recommended, in particular, the number of user IDs equal to the calculated number of users to whom the live-stream is recommended.

Referring again to FIG. 3, upon reception of a live-stream start signal indicating the start of a live-stream from the user terminal 20 of the streamer over the network NW, the stream information providing unit 302 registers, in the stream DB 314, a stream ID identifying this live-stream, the streamer ID of the streamer who hosts the live-stream, a start time of the live-stream, and the content tag of the live-stream if available. The stream information providing unit 302 generates a recommended live-stream list by referring to the stream DB 314 and the like, and transmits the list to user terminals of the active users over the network NW. The stream information providing unit 302 includes a preferential recommendations specifying unit 330, a calculation unit 332 for calculating the number of users to whom the recommendation is shown, a user pool generating unit 334, a recommendation list setting unit 336, and a recommendation list transmission unit 338.

The preferential recommendations specifying unit 330 specifies the live-stream as the live-stream to be preferentially recommended in response to receipt of the live-stream start signal indicating the initiation of the live-stream. The preferential recommendations specifying unit 330 performs a process periodically (e.g., once a day, once an hour, once every 10 minutes, etc.) to specify the live-stream(s) to be preferentially recommended. A method of specifying the target by the preferential recommendations specifying unit 330 includes: a batch processing method that specifies the preferentially recommended live-stream retrospectively or backward in time from a predetermined time and; a real-time processing method that specifies the preferentially recommended live-stream forward in time from a predetermined time or as time passes.

Figure 11A:
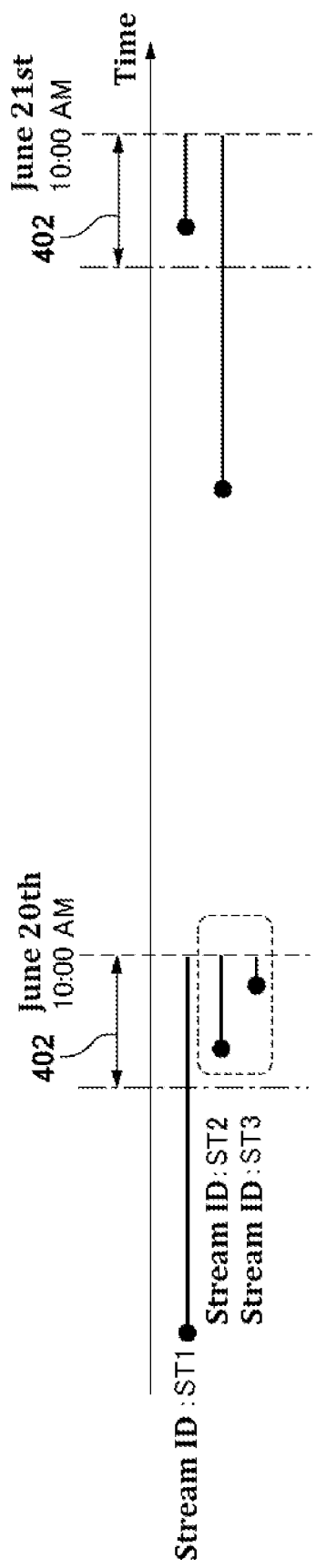
FIGS. 11A and 11B illustrate methods of specifying a live-stream(s) that is preferentially recommended performed in a preferential recommendations specifying unit.
Figure 11B:
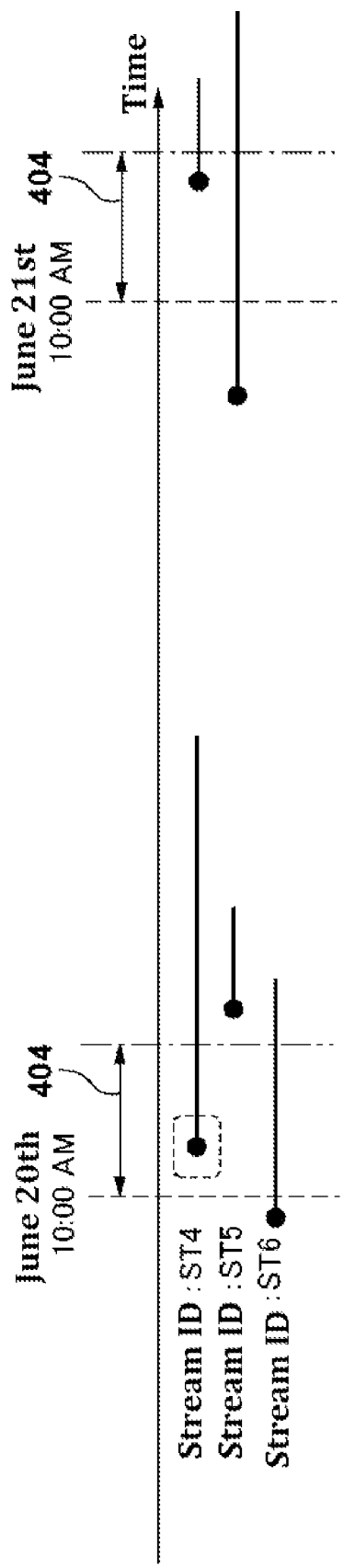

FIGS. 11A and 11B illustrate the methods of specifying a live-stream(s) that is preferentially recommended performed in the preferential recommendations specifying unit 330. FIG. 11A illustrates the batch processing method, while FIG. 11B illustrates the real-time processing method. In FIG. 11A, the black circle indicates the start of the live-stream, and the solid line extending from the black circle indicates that the live-stream is continuing. The same applies to FIG. 11B.

<Batch Processing Method>

At a predetermined time, the preferential recommendations specifying unit 330 sets the predetermined time as the end time and a time a predetermined duration (e.g., 30 minutes) back from the end time as the start time, so sets a specified period 402 spanning from the start time to the end time. The preferential recommendations specifying unit 330 refers to the stream DB 314 and specifies the live-streams whose start time falls within the specified period 402 as the preferentially recommended live-streams. Since the start time is registered in the stream DB 314 only after the live-stream start signal is received and the live-stream whose start time falls within the specified period 402 is specified as the live-stream that is preferentially recommended, it can be said that the live-stream to be preferentially recommended is specified in response to the receipt of the live-stream start signal.

In the example of FIG. 11A, the preferential recommendations specifying unit 330 performs the process to specify the live-stream(s) to be preferentially recommended once a day at 10:00 a.m. At 10:00 a.m. on June 20, the preferential recommendations specifying unit 330 sets the specified period 402 with 10:00 a.m. as the end time and 9:30 a.m. as the start time. The preferential recommendations specifying unit 330 refers to the stream DB 314 and specifies live-streams "ST2" and "ST3" whose start times are within the specified period 402 as the live-streams that is to be preferentially recommended. Since the live-stream "ST1" starts before the start time of the specified period 402, it is not the live-stream to be preferentially recommended. At 10:00 a.m. on June 21, the preferential recommendations specifying unit 330 performs the same process.

<Real-Time Processing Method>

At a predetermined time, the preferential recommendations specifying unit 330 sets the predetermined time as the start time and a time a predetermined duration (e.g., 30 minutes) forward from the start time as the end time, so sets a specified period 404 spanning from the start time to the end time. When the preferential recommendations specifying unit 330 receives a live-stream start signal during the specified period 404, it specifies the live-stream associated with the received live-stream start signal as the live-stream to be preferentially recommended.

In the example of FIG. 11B, the preferential recommendations specifying unit 330 initiates the process to specify the live-stream to be preferentially recommended once a day at 10:00 a.m. At 10:00 a.m. on June 20, the preferential recommendations specifying unit 330 sets the specified period 404 with 10:00 a.m. as the start time and 10:30 a.m. as the end time. The preferential recommendations specifying unit 330 waits for or monitors whether a live-start start signal is received during the specified period 404. When the preferential recommendations specifying unit 330 receives a live-stream start signal indicating the start of the live-stream "ST4" during the specified period 404, it specifies the live-stream "ST4" as the live-stream to be preferentially recommended. Since the live-stream "ST5" starts after the end time of the specified period 404, it is not the live-stream to be preferentially recommended. Since the live-stream "ST6" starts before the start time of the specified period 404, it is not the live-stream to be preferentially recommended. At 10:00 a.m. on June 21, the preferential recommendations specifying unit 330 performs the same process.

Referring again to FIG. 3, the calculation unit 332 obtains, for each of the live-streams specified by the preferential recommendations specifying unit 330, the number of users to whom the live-stream is recommended. The calculation unit 332 determines the number of users to whom the live-stream is recommended depending on the level of the streamer of the specified live-stream. The number of users to whom the live-stream is recommended is determined based on the required number of established viewers, the required number of clicks, and the average click rate.

The calculation unit 332 refers to the stream DB 314 and specifies the streamer ID of the live-stream to be preferentially recommended. The calculation unit 332 refers to the user DB 318 and specifies the level associated with the specified streamer ID. The calculation unit 332 refers to the settings DB 324 and specifies the required number of established viewers and the required number of clicks corresponding to a level range including the specified level. The calculation unit 332 refers to the click rate DB 322 and determines the average click rate corresponding to a prescribed priority setting. The priority setting is a setting generated by the administrator and indicates how much priority is given to the live-stream to be preferentially recommended. In this embodiment, the priority setting includes the specification of a priority range. In the example of FIG. 7, when the priority setting includes a priority range of "1 to 6", the calculation unit 332 obtains an average click rate of "10%. The priority setting may be defined by the administrator based on the status of the live-streaming platform, such as the number of active users, time of year, number of events, etc.

The calculation unit 332 calculates the number of users to whom the live-stream is recommended using the following formula:

> The number of users to whom the live-stream is recommended=(the required number of established viewers)×(the required number of clicks)/(the average click rate)

In the examples of FIGS. 5, 7, and 8, when the live stream of the streamer "LR2" is specified as the live-stream to be preferentially recommended, the required number of established viewers is "five" and the required number of clicks is "three" are obtained for the level "7" of the streamer "LR2". The average click rate "10%" is obtained according to the priority setting. The number of users to whom the live-stream is recommended is calculated as 5×3/0.1=150.

The user pool generating unit 334 generates a user pool by selecting active users as many as or a corresponding number of active users to the calculated number of users to whom the live-stream is recommended calculated by the calculation unit 332. The user pool generating unit 334 generates the user pool table 326 that is associated with the live-stream to be preferentially recommended. At this stage, the user pool table 326 does not contain any data. The live-stream to be preferentially recommended corresponds one-to-one with the user pool table. The user pool generating unit 334 obtains the attributes of the live-stream to be preferentially recommended. More specifically, the user pool generating unit 334 refers to the stream DB 314 to identify the streamer ID, the content tag of the live-stream to be preferentially recommended. The user pool generating unit 334 refers to the user DB 318 to obtain the attributes of the user (streamer) corresponding to the identified streamer ID and obtain the level of the user. The attributes of the live-stream to be preferentially recommended include the attributes and level of the streamer, and the content tag of the live-stream. The user pool generating unit 334 refers to the user DB 318 to specify users whose status is active (i.e., active users) and their attributes. The user pool generating unit 334 calculates the similarity score between the live-stream to be preferentially recommended and the specified active user based on the attributes of the live-stream to be preferentially recommended and the attributes and viewing history of the identified active user. The viewing history is obtained from a viewing history DB not shown in the drawings. Calculation of the similarity score between the live-stream and the user may be realized using a known machine learning technique, such as described in, for example, the '207 Publication. Alternatively, the calculation of the similarity score between the live-stream and the user may also be realized using a known matching technique, such as described in, for example, Japanese Patent Application Publication No. 2019-164617. The user pool generating unit 334 calculates, for each of the active users registered in the user DB 318, the similarity score between the live-stream to be preferentially recommended and the user. The user pool generating unit 334 specifies the number of active users equal to the number of users to whom the live-stream is recommended in descending order of the calculated similarity score, and registers the user IDs of the specified active users and their similarity scores in the user pool table 326 that has been generated in advance.

The recommendation list setting unit 336 sets the recommended live-stream list, i.e., the list of live-streams to be recommended to the active user at the user terminal of the active user registered in the user pool table 326 generated by the user pool generating unit 334. The list is made such that the live-stream to be preferentially recommended corresponding to the table 326 will be presented in priority over other live-streams. The recommendation list setting unit 336 generates the recommended live-stream list for each active user registered in the user pool table 326 by performing the matching process similar to the matching process between the live-stream and users performed by the user pool generating unit 334. When generating the recommended live-stream list, the recommendation list setting unit 336 lists the live-streams to be preferentially recommended within the priority range.

Figures 12B, 12C:
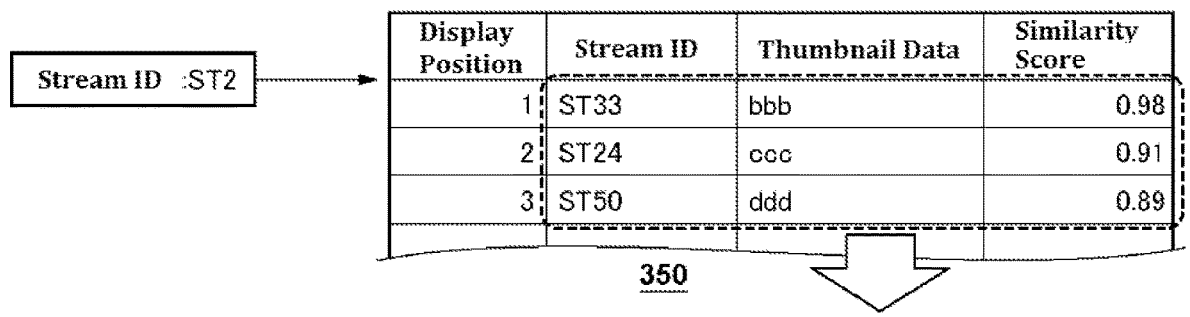

FIGS. 12A, 12B, and 12C illustrate the process of generating a recommended live-stream list 350. The recommended live-stream list 350 shown in FIG. 12C is an example of the list of live-streams recommended to the active user "US1" registered in the user pool table 326 of FIG. 9. The recommendation list setting unit 336 first registers, in the recommended live-stream list 350, the stream IDs, thumbnail data, and the similarity scores of a predetermined number of live-streams, e.g., 100, in order from the one with the highest similarity score with the active user "US1". At this time, the recommendation list setting unit 336 assigns more prominent display positions in descending order of the similarity score. In the example of FIG. 12A, the live-stream "ST33" with the highest similarity score is assigned the most prominent display position "1".

The recommendation list setting unit 336 determines the display position at which to insert or move the live-stream to be preferentially recommended. The recommendation list setting unit 336 may randomly select one display position from the priority range, or it may select one display position from the priority range by a round robin method among the active users registered in the user pool table 326.

The recommendation list setting unit 336 updates the recommended live-stream list 350 to vacate the determined display position. In the example of FIG. 12B, the display position "1" has been determined as the insertion destination and the recommendation list setting units 336 updates data of all the registered live-streams to increment their display position by one (+1). In the other example, when display position "2" is determined, the recommendation list setting unit 336 keeps the live-stream remained at display position "1" as already registered, and updates the data of all the live-streams at display position "2" or greater so that the display positions are incremented by one (+1).

The recommendation list setting unit 336 moves or inserts the stream ID "ST2", its thumbnail data, and its similarity score of the live-stream to be preferentially recommended that has been associated with the user pool table 326 in which the active user "US1" is registered, to the determined display position. If the live-stream "ST2" has been already registered in the recommended live-stream list 350, the data of the live-stream is moved, and if not, new data is inserted. In the example in FIG. 12B, after display position "1" is vacated, the data of live-stream "ST2" to be preferentially recommended is inserted thereto. As a result, the recommended live-stream list 350 of FIG. 12C is generated. FIG. 12C shows the recommended live-stream list 350 for the active user "US1" registered in the user pool table 326 of the live-stream "ST2" to be preferentially recommended. In this list 350, the live-stream "ST2" to be preferentially recommended is listed at the most preferred display position "1", although the similarity score with the active user "US1" is relatively low.

Referring again to FIG. 3, the recommendation list transmission unit 338 transmits the recommended live-stream list 350 generated by the recommendation list setting unit 336 to the user terminal of the corresponding active user over the network NW. The user terminal of the active user shows on its display the live-stream recommendations screen 600, as shown in FIG. 10, based on the received recommended live-stream list 350. Once the active user opens the live-stream recommendations screen 600, thumbnails at display positions 1 to 6 are first displayed, so it can be said that the live-streams corresponding to those display positions are preferentially recommended.

Upon receipt of selection of a live-stream on the live-stream recommendations screen 600 by the active user, the viewer-side communication unit 204 of the user terminal generates a streaming request including the stream ID of the selected live-stream, and transmits the request to the server 10 over the network NW. The stream information providing unit 302 starts providing, to the requesting user terminal, the live-stream specified by the stream ID included in the received streaming request. The stream information providing unit 302 updates the stream DB 314 to include the user ID of the active user of the requesting user terminal into the viewer IDs of the stream ID.

The relay unit 304 relays the video data from the distributor-side user terminal 20 to the viewer-side user terminal 30 in the live-stream started by the distribution information providing unit 302. The relay unit 304 receives from the viewer-side communication unit 204 a signal that represents user input by a viewer during the live-stream or reproduction of the video data. The signal that represents user input may be an object specifying signal for specifying an object displayed on the display of the user terminal 30, and the object specifying signal includes the viewer ID of the viewer, the distributor ID of the distributor of the live-stream that the viewer watches, and an object ID that identifies the object. When the object is a gift icon, the object ID is the gift ID. The object specifying signal in that case is a gift use signal indicating that a viewer uses a gift for a distributor. Similarly, the relay unit 304 receives from the distributor-side communication unit 110 of the streaming unit 100 in the user terminal 20 a signal that represents user input by the distributor during reproduction of the video data, such as the object specifying signal.

The gift processing unit 308 updates the user DB 318 so as to increase the reward of the distributor depending on a granted reward of the gift identified by the gift ID included in the object specifying signal. Specifically, the gift processing unit 308 refers to the gift DB 320 to specify a granted reward for the gift ID included in the received gift use signal. The gift processing unit 308 then updates the user DB 318 to add the determined granted reward to the reward of the distributor ID included in the gift use signal.

The payment processing unit 310 processes payment of a price of the gift by a viewer in response to reception of the gift use signal. Specifically, the payment processing unit 310 refers to the gift DB 320 to specify the price points of the gift identified by the gift ID included in the gift use signal. The payment processing unit 310 then updates the user DB 318 to subtract the specified price points from the points of the viewer identified by the viewer ID included in the gift use signal.

The stream evaluation unit 312 gives a positive rating to a live-stream to be preferentially recommended when the live-stream satisfies the evaluation criteria regarding the required number of established viewers, and otherwise gives a negative rating to the live-stream. The evaluation criterion includes whether the live-stream acquires established viewers more than the required number of established viewers during the period starting from when the live-stream is identified as the one to be preferentially recommended and to the expiration of a priority period (e.g., 15 minutes). The evaluation criterion is satisfied when the live-stream has acquired more than the required number of established viewers.

The stream evaluation unit 312 monitors the live-streams to be preferentially recommended and counts the number of established viewers of those live-streams. For example, when the continuous viewing time of a viewer of the live-stream to be preferentially recommended exceeds 5 minutes, the stream evaluation unit 312 counts that viewer as the established viewer of the live-stream. The stream evaluation unit 312 updates the stream DB 314 with the obtained number of established viewers. The stream evaluation unit 312 compares the number of established viewers of the live-stream being monitored with the required number of established viewers for the live-stream each time a refresh period (e.g., 3 minutes) elapses. When the comparison result shows that the former is greater than or equal to the latter, the stream evaluation unit 312 updates the stream DB 314 so that the rating of the live-stream becomes "good". Regarding the relationship between the priority period and the refresh period, the priority period includes the refresh period but is set longer than it. The process performed by the stream evaluation unit 312 will be further described later.

Figure 13:
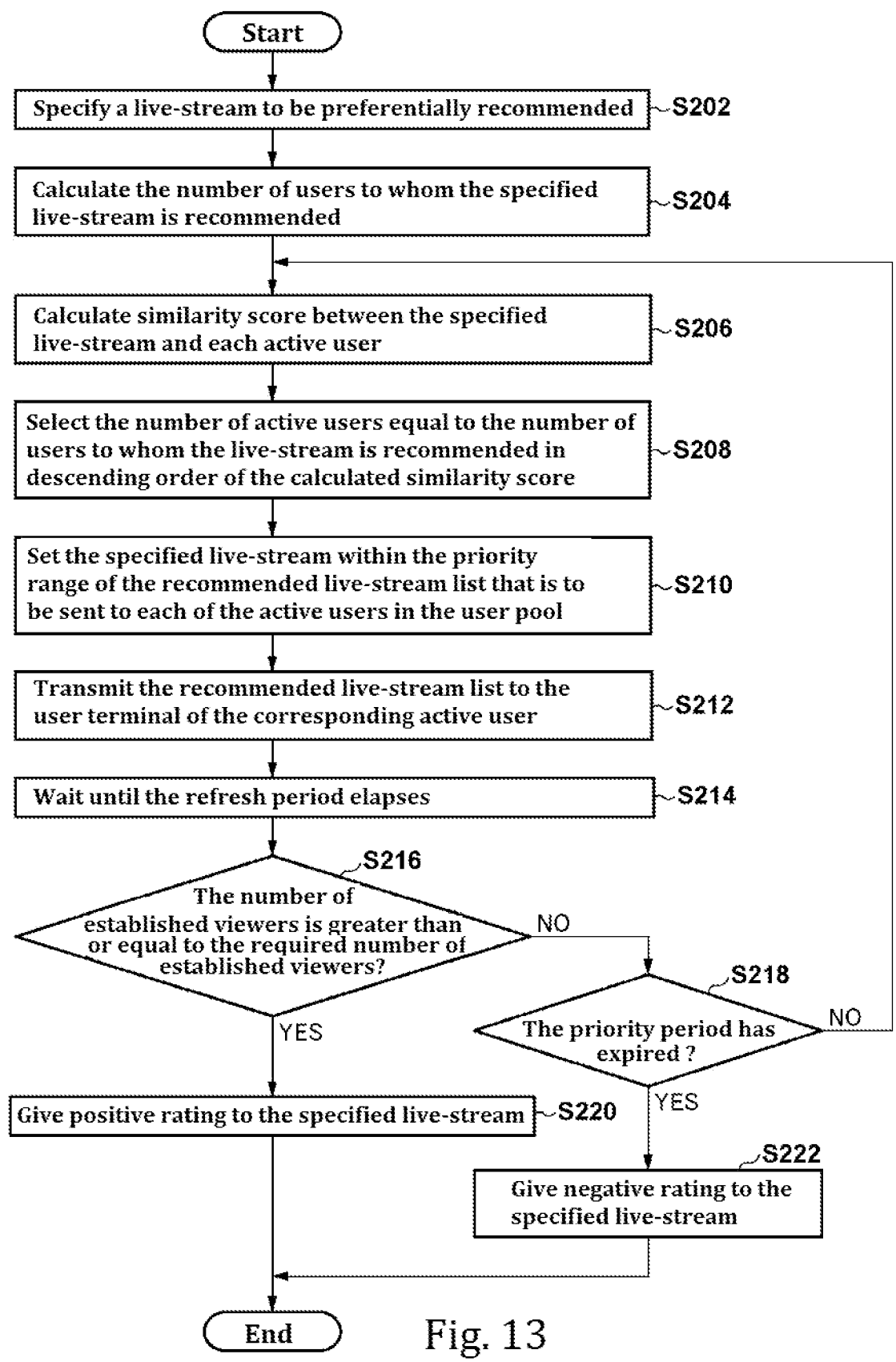
FIG. 13 is a flowchart showing steps of an evaluation process of the live-stream to be preferentially recommended on a server.

The operation of the live-streaming system 1 with the above configuration will be now described. FIG. 13 is a flowchart showing steps of the evaluation process of the live-stream to be preferentially recommended on the server 10. The preferential recommendations specifying unit 330 specifies a live-stream(s) to be preferentially recommended (S202). The calculation unit 332 for calculating the number of users to whom the live-stream is recommended calculates the number of users to whom the specified live-stream is recommended (S204). The user pool generating unit 334 calculates a similarity score between the specified live-stream and each active user (S206). The user pool generating unit 334 generates a user pool by selecting the number of active users equal to the number of users to whom the live-stream is recommended in descending order of the calculated similarity score (S208). The recommendation list setting unit 336 sets the specified live-stream within the priority range of the recommended live-stream list that is to be sent to each of the active users in the user pool generated in step S208 (S210). The recommendation list transmission unit 338 transmits the recommended live-stream list set in step S210 to the user terminal of the corresponding active user (S212).

After the recommended live-stream list is sent to the user terminal of each active user in the user pool in step S212, the stream evaluation unit 312 waits until the refresh period elapses (S214). At the same time, the stream evaluation unit 312 monitors the live-stream specified in step S202 and counts the number of its established viewers. When the refresh period elapses, the stream evaluation unit 312 determines whether the number of established viewers at that time is greater than or equal to the required number of established viewers (S216). For example, the stream evaluation unit 312 refers to the stream DB 314 to obtain the number of established viewers at that time of the live-stream identified in step S202. The stream evaluation unit 312 refers to the settings DB 324 to obtain the required number of established viewers corresponding to the level of the streamer who delivers the live-stream. The stream evaluation unit 312 makes the evaluation by comparing the obtained number of established viewers with the obtained required number of established viewers.

When it is determined in step S216 that the number of established viewers is greater than or equal to the required number of established viewers (YES in S216), the stream evaluation unit 312 gives a positive rating to the specified live-stream (S220). The stream evaluation unit 312 updates the stream DB 314 so that "good" is registered as the rating of the specified live-stream. When it is determined in step S216 that the number of established viewers is less than the required number of established viewers (NO in S216), the stream evaluation unit 312 determines whether the priority period of the live-stream specified in step S202 has expired (S218). When the priority period has not expired (NO in S218), the process returns to step S206 and a new user pool is generated. Whereas when it has expired (YES in S218), the stream evaluation unit 312 gives a negative rating to the specified live-stream (S222). The stream evaluation unit 312 updates the stream DB 314 so that "bad" is registered as the rating of the specified live-stream.

As a result of the above process, when the live-stream to be preferentially recommended does not satisfy the evaluation criterion within the refresh period (NO in S216) and a negative rating is not given by the stream evaluation unit 312 (NO in S218), the user pool generating unit 334 will generate a new user pool. When the live-stream to be preferentially recommended does not satisfy the evaluation criteria within the priority period, the stream evaluation unit 312 will gives a negative rating to the live-stream.

The recommendation list setting unit 336 may generate a recommended live-stream list for each active user registered in the user pool table 326 based on the rating given to the live-stream in steps S220 and S222 above. For example, the similarity score calculation formula may be set such that a live-stream with a "good" rating has a higher similarity score than a live-stream with a "bad" rating, while all other conditions between these live-streams being equal. Alternatively, the recommendation list setting unit 336 may also not include the live-streams with a "bad" rating in the recommended live-stream list.

In the above embodiment, an example of the holding unit includes a hard disk or semiconductor memory. It is understood by those skilled in the art that each element or component can be realized by a CPU not shown, a module of an installed application program, a module of a system program, or a semiconductor memory that temporarily stores the contents of data read from a hard disk, and the like.

In the live-streaming system 1 related to the embodiment, a live-stream that has just started or shortly after the start is specified as a live-stream to be preferentially recommended and such a live-stream is preferentially recommended to active users having a high similarity score with the live-stream. Accordingly, viewers are more likely to watch the preferentially recommended live-stream, and the streamer can be motivated to continue live-streaming. In addition, by limiting the number of users to whom the live-stream is preferentially recommended to the predetermined number of users, each live-stream can be displayed high on the list for a sufficient period of time even when many live-streams are started at the same time.

In the live-streaming system 1, the number of users to whom the live-stream is recommended is determined according to the level of the streamer. By using the number of users to whom the live-stream is recommended as a variable that depends on the level of the streamer in this way, it is possible to absorb differences in the streamers' tendencies due to their level difference.

In the live-streaming system 1, the number of users to whom the live-stream is recommended for the live-stream to be preferentially recommended is calculated so that the live-stream can secure the required number of established viewers obtained by analyzing the viewing data of past live-streams. During the priority period starting from the start of the live-stream, the generation of the user pool and transmission of the recommended live-stream list are repeated until the required number of established viewers is achieved. Therefore, compared to the case where the live-stream to be preferentially recommended are recommended to all active users, the priority period can be made longer by limiting the number of active users to the predetermined number of users, or the number of live-streams that can be specified as the live-streams to be preferentially recommended can be increased. In this way, it is possible to reduce the number of streamers who give up live-streaming due to lack of viewers and improve the satisfaction level of streamers.

If the live-stream to be preferentially recommended is actually recommended to all active users without any limitations, as the number of live-streams to be preferentially recommended increases, the period during which each live-stream can be preferentially recommended becomes shorter, or the number of live-streams that can be selected to be preferentially recommended becomes smaller. In addition, according to the inventor's own study, the number of established viewers does not necessarily grow proportionally as the number of active users to whom the live-stream is preferentially recommended is increased. Therefore, it is not appropriate to preferentially recommend the live-stream to be recommended to all active users. In the above embodiment, the number of users to whom the live-stream is recommended is predetermined, and the number of active users to whom the live-stream is actually recommended is limited to this predetermined number. This makes it possible to optimize the priority recommendation.

In conventional live-streaming platforms, there is positive feedback: once a live-stream becomes popular, the number of viewers watching that live-stream increases quickly, which increases the score of the live-stream, and consequently the live-stream is displayed high up on the list of recommendations or searches, which in turn increases the number of viewers further. This is a suitable system for streamers who want to increase their recognizability and popularity at once. However, this conventional system is unfavorable for streamers who have just started live-streaming and for late-bloomer-type streamers who want to improve the quality of their live-streams by continuing live-streaming steadily. Under such conventional systems, it is unlikely that new streamers and late-bloomer-type streamers will appear top in the list of search results or recommendations, and therefore, it is difficult for them to attract viewers to their live-streams.

In addition, in the conventional system, a popular live-stream with a high score is not necessarily a high quality live-stream. This is because even if the quality of the live-stream is poor, once the live-stream goes viral, it can quickly become popular. This situation is undesirable for live-streaming platforms that need to provide a high quality live-streaming service.

Therefore, the live-streaming system 1 related to the embodiment provides a mechanism to evaluate live-streams as equally as possible. A live-stream identified as a live-stream to be preferentially recommended is also a live-stream to be evaluated at the same time. The criterion for the evaluation is whether the live-stream can obtain more than the required number of established viewers within the priority period from the start of the live-stream. In this case, the number of users to whom the live-stream is recommended, which is the number of active users registered in the user pool of the live-stream, is determined depending on the streamer's level, and the required number of established viewers is also determined depending on the streamer's level. In other words, in the embodiment, a higher-level streamer is allocated a larger number of users to whom his/her live-stream is recommended, but at the same time, the required number of established viewers that the streamer has to achieve is also increased. This allows more equal comparison and evaluation between live-streams of higher-level streamers and live-streams of lower-level streamers. In addition, by using the number of established viewers for evaluation, the quality of the live-streams can be evaluated more accurately from the viewer's perspective.

Further, the live-streaming system 1 related to the embodiment generates or updates the recommended live-stream list based on the ratings given to the live-streams. Therefore, it is possible to recommend higher quality live-streams to users.

In addition, in the live-streaming system 1, the administrator is able to change the values of the parameters held in the click rate DB 322 and settings DB 324 as appropriate depending on the results of data analysis. Thus, effective operation based on the actual conditions of the live-streaming platform is realized.

Figure 14:
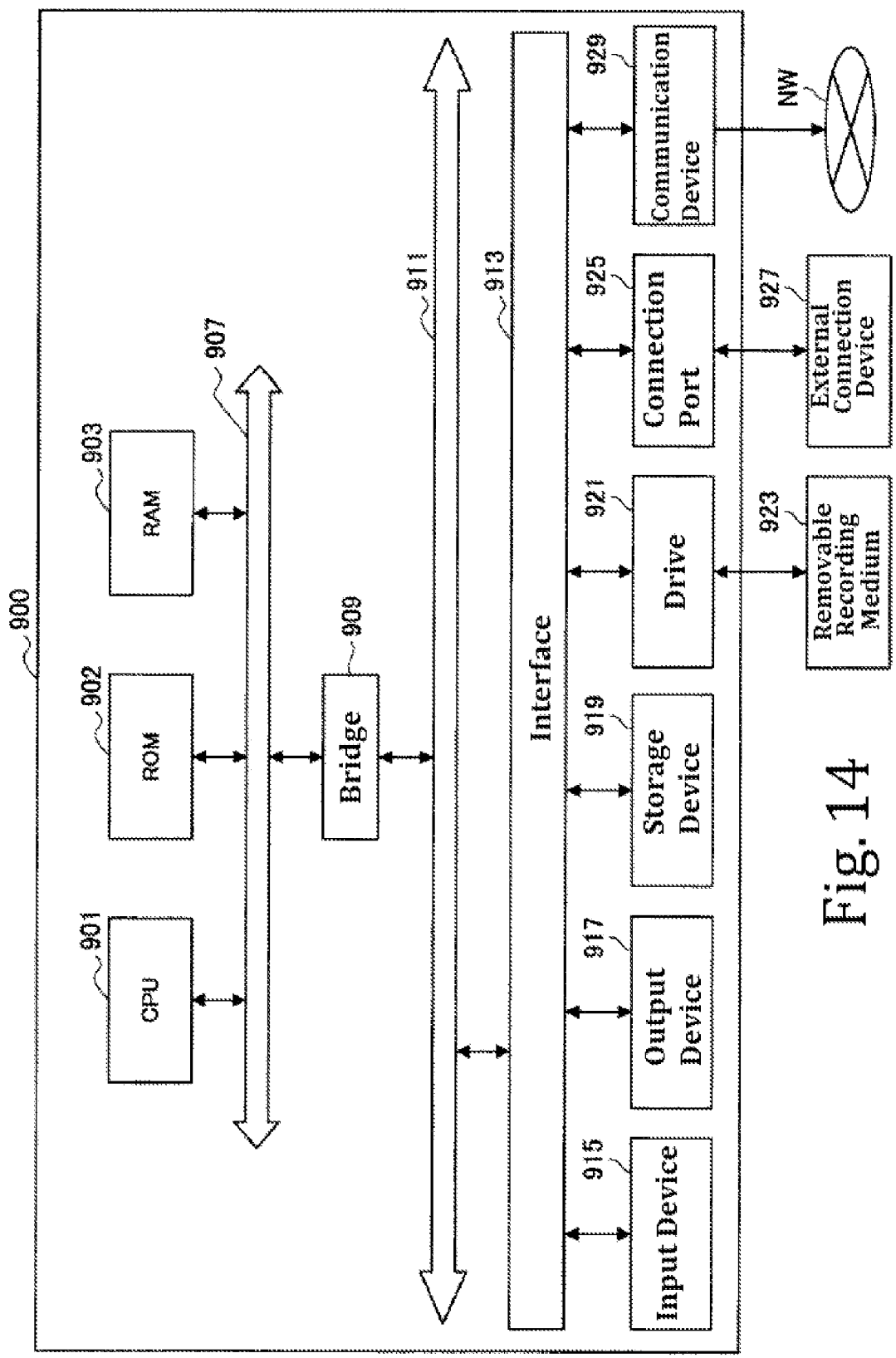
FIG. 14 is a block diagram showing an example of a hardware configuration of an information processing device according to the embodiment.

Referring to FIG. 14, the hardware configuration of the information processing device will be now described. FIG. 14 is a block diagram showing an example of the hardware configuration of the information processing device according to the embodiment. The illustrated information processing device 900 may, for example, realize the server 10 and the user terminals 20 and 30 in the embodiment.

The information processing device 900 includes a CPU 901, ROM (Read Only Memory) 902, and RAM (Random Access Memory) 903. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown). In addition to or instead of the CPU 901, the information processing device 900 may also include a DSP (Digital Signal Processor) or ASIC (Application Specific Integrated Circuit).

The CPU 901 functions as an arithmetic processing device and a control device, and controls all or some of the operations in the information processing device 900 according to various programs stored in the ROM 902, the RAM 903, the storage device 919, or a removable recording medium 923. For example, the CPU 901 controls the overall operation of each functional unit included in the server 10 and the user terminals 20 and 30 in the embodiment. The ROM 902 stores programs including sets of instructions, calculation parameters, and the like used by the CPU 901. The RAM 903 serves as a primary storage that stores programs including sets of instructions to be used in the execution of the CPU 901, parameters that appropriately change in the execution, and the like. The CPU 901, ROM 902, and RAM 903 are interconnected to each other by the host bus 907 which may be an internal bus such as a CPU bus. Further, the host bus 907 is connected to the external bus 911 such as a PCI (Peripheral Component Interconnect/Interface) bus via the bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OELD, etc., a sound output device such as a speaker and headphones, and a printer. The output device 917 outputs the results of processing by the information processing device 900 as text, video such as images, or sound such as audio.

The storage device 919 is a device for storing data configured as an example of a storage unit of the information processing device 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for the removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 903. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is, for example, a camera for capturing an image of the real space to generate the captured image. The image capturing device uses an imaging element such as a CCD (Charge Coupled Device) or CMOS (Complementary Metal Oxide Semiconductor) and various elements such as lenses that are provided to control image formation of a subject on the imaging element. The image capturing device may capture a still image or may capture a moving image.

The configuration and operation of the live-streaming system 1 in the embodiment have been described. This embodiment is a merely example, and it is understood by those skilled in the art that various modifications are possible for each component and a combination of each process, and that such modifications are also within the scope of the present disclosure.

In the above embodiment, the case in which the live-stream to be preferentially recommended is preferentially recommended to active users by placing its thumbnail in a more prominent position on the live-stream recommendations screen. However, the embodiment is not limited to this case. For example, a push notification or banner advertisement may be used to recommend the live-stream to be preferentially recommended to active users. In this case, push notifications are sent or banner advertisements are displayed to active users registered in the user pool corresponding to the live-stream to be preferentially recommended.

In the above embodiment, the case in which the recommendation list setting unit 336 generates a recommended live-stream list for each active user in the user pool has been described, but is not limited to this. For example, the recommendation list setting unit 336 may update a recommended live-stream list that has been already generated elsewhere for an active user so that the live-stream to be preferentially recommended is displayed at a display position within the priority range. In this case, when receiving a request to provide information about live-streams from the user terminal 30 of an active user registered in the user pool of the live-stream to be preferentially recommended over the network NW, the stream information providing unit 302 refers to the stream DB 314 to generate the recommended live-stream list. The recommendation list setting unit 336 updates the recommended live-stream list generated by the stream information providing unit 302 so that the live-stream to be preferentially recommended is preferentially presented. The stream information providing unit 302 transmits the recommended live-stream list to the requesting user terminal 30 over the network NW.

Alternatively, the recommendation list setting unit 336 may also add a command to the information accompanying with the list to display the live-stream to be preferentially proposed at a display position within the priority range, instead of changing the recommended live-stream list itself.

In the above embodiment, the case in which the stream evaluation unit 312 is provided to evaluate live-streams to be preferentially recommended has been described. However, this is not limited to this case, and when live-streams are not evaluated, the stream evaluation unit 312 need not be provided.

The conversion rate from the points paid for the gift to the granted reward in the embodiment is merely example, and the conversion rate may be appropriately set by the administrator of the live-streaming system 1, for example.

The technical idea according to the embodiment may be applied to live commerce or virtual live-streaming using an avatar that moves in synchronization with the movement of the distributor instead of the image of the distributor.

The procedures described herein, particularly those described with a flow diagram, a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention.

At least some of the functions realized by the server 10 may be realized by a device(s) other than the server 10, for example, the user terminals 20 and 30. At least some of the functions realized by the user terminals 20 and 30 may be realized by a device(s) other than the user terminals 20 and 30, for example, the server 10. For example, the superimposition of a predetermined frame image on an image of the video data performed by the viewer's user terminal may be performed by the server 10 or may be performed by the distributor's user terminal.

What is claimed is:

1. A server, comprising:
a specifying unit for specifying a live-stream to be preferentially recommended;
an obtaining unit for obtaining, for the specified live-stream to be preferentially recommended, a number of users to whom the live-stream is recommended;
a generating unit for generating a group of users by selecting a number of users corresponding to the obtained number of users to whom the live-stream is recommended; and
a setting unit for setting a list of live-streams to be recommended to a user included in the generated group of users such that the live-stream to be preferentially recommended is presented in priority over other live-streams in the list on a terminal of the user,
wherein the number of users to whom the live-stream is recommended is determined depending on an indicator of past performance of a streamer of the specified live-stream on a live-streaming platform, and the obtaining unit obtains the determined number of users to whom the live-stream is recommended,
wherein the number of users to whom the live-stream is recommended is determined based on a first parameter depending on a streaming continuation rate of the streamer, and a second parameter depending on a viewing continuation rate of a viewer,
wherein the specifying unit specifies the live-stream as the live-stream to be preferentially recommended in response to receipt of a signal indicating start of the live-stream,
wherein the server further comprises an evaluation unit for giving a positive rating to the live-stream to be preferentially recommended when the live-stream satisfies an evaluation criterion regarding the first parameter, and giving a negative rating to the live-stream when the positive rating is not given to the live stream, wherein the generating unit generates a new group of users when the live-stream to be preferentially recommended does not satisfy the evaluation criterion within a first period of time and the negative rating is not given by the evaluation unit, and wherein the evaluation unit gives the negative rating to the live-stream to be preferentially recommended when the live-stream does not satisfy the evaluation criterion within a second period of time, the second period includes the first period and is longer than the first period.

2. The server of claim 1, wherein the first parameter is set such that the higher past performance of the streamer, the greater the number of users to whom the live-stream is recommended, and the second parameter is set such that the higher the past performance of the streamer, the smaller the number of users to whom the live-stream is recommended.

3. The server of claim 1, wherein the number of users to whom the live-stream is recommended is determined also based on a probability that a user will select the live-stream when the live-stream is preferentially proposed to the user.

4. The server of claim 1, wherein the setting unit sets the list of live-streams to be recommended to a user based on ratings given to the live-streams.

5. A method, comprising:

specifying a live-stream to be preferentially recommended;

obtaining, for the specified live-stream to be preferentially recommended, a number of users to whom the live-stream is recommended;

generating a group of users by selecting a number of users corresponding to the obtained number of users to whom the live-stream is recommended; and setting a list of live-streams to be recommended to a user included in the generated group of users such that the live-stream to be preferentially recommended is presented in priority over other live-streams in the list on a terminal of the user, wherein the number of users to whom the live-stream is recommended is determined depending on an indicator of past performance of a streamer of the specified live-stream on a live-streaming platform, wherein the number of users to whom the live-stream is recommended is determined based on a first parameter depending on a streaming continuation rate of the streamer, and a second parameter depending on a viewing continuation rate of a viewer, wherein the live-stream is specified as the live-stream to be preferentially recommended in response to receipt of a signal indicating start of the live-stream, wherein the method further comprises giving a positive rating to the live-stream to be preferentially recommended when the live-stream satisfies an evaluation criterion regarding the first parameter, and giving a negative rating to the live-stream when the positive rating is not given to the live stream, wherein the generating unit generates a new group of users when the live-stream to be preferentially recommended does not satisfy the evaluation criterion within a first period of time and the negative rating is not given by the evaluation unit, and wherein the evaluation unit gives the negative rating to the live-stream to be preferentially recommended when the live-stream does not satisfy the evaluation criterion within a second period of time, the second period includes the first period and is longer than the first period.

6. The method of claim 5, wherein the first parameter is set such that the higher past performance of the streamer, the greater the number of users to whom the live-stream is recommended, and the second parameter is set such that the higher the past performance of the streamer, the smaller the number of users to whom the live-stream is recommended.

7. The method of claim 5, wherein the number of users to whom the live-stream is recommended is determined also based on a probability that a user will select the live-stream when the live-stream is preferentially proposed to the user.

8. The server of claim 5, wherein the list of live-streams to be recommended to a user is set based on ratings given to the live-streams.

* * * * *